(12) United States Patent
Graef

(10) Patent No.: US 7,729,075 B2
(45) Date of Patent: Jun. 1, 2010

(54) LOW-POWER READ CHANNEL FOR MAGNETIC MASS STORAGE SYSTEMS

(75) Inventor: Nils Graef, San Jose, CA (US)

(73) Assignee: Agere Systems Inc., Allentown, PA (US)

( * ) Notice: Subject to any disclaimer, the term of this patent is extended or adjusted under 35 U.S.C. 154(b) by 379 days.

(21) Appl. No.: 11/982,261

(22) Filed: Oct. 31, 2007

(65) Prior Publication Data

US 2009/0109564 A1    Apr. 30, 2009

(51) Int. Cl.
G11B 5/09    (2006.01)

(52) U.S. Cl. ........................................................ 360/51

(58) Field of Classification Search .................. 360/51, 360/31, 32, 39, 43, 75; 710/69; 375/222; 369/59.21; 370/235; 341/61; 702/66
See application file for complete search history.

(56) References Cited

U.S. PATENT DOCUMENTS

| 5,327,302 | A |   | 7/1994  | Khoury et al. |
| 5,488,588 | A | * | 1/1996  | Engeler et al. ................. 367/7 |
| 5,706,203 | A | * | 1/1998  | Kawauchi .................... 702/66 |
| 5,734,598 | A | * | 3/1998  | Abbott et al. ............... 708/322 |
| 5,793,804 | A | * | 8/1998  | Ma ............................. 375/222 |
| 5,909,330 | A | * | 6/1999  | Carlson et al. ................ 360/31 |
| 6,078,972 | A | * | 6/2000  | Takai .......................... 710/69 |
| 6,315,726 | B1| * | 11/2001 | Watanabe .................... 600/447 |
| 6,445,662 | B1| * | 9/2002  | Tonami .................... 369/59.21 |
| 6,661,590 | B2| * | 12/2003 | Cyrusian et al. .............. 360/32 |
| 6,947,096 | B2| * | 9/2005  | Kumazawa .................. 348/488 |
| 7,408,485 | B1| * | 8/2008  | Yu et al. ....................... 341/61 |
| 7,577,095 | B2| * | 8/2009  | Shay et al. .................. 370/235 |

OTHER PUBLICATIONS

Cideciyan et al., "A PRML System for Digital Magnetic Recording," IEEE Journal on Selected Areas in Communications, vol. 10, No. 1, pp. 38-56, Jan. 1992.
Dolivio et al., "Fast Timing Recovery for Partial-Response Signaling Systems," IEEE Int. Conf. On Communications conference record, pp. 0573-577, Jun. 11-14, 1989.
Wu et al., "A MMSE Interpolated Timing Recovery Scheme for the Magnetic Recording Channel," 1997 IEEE Int. Conf. on Communications, vol. 3, pp. 1625-1629, Jun. 8-12, 1997.

* cited by examiner

*Primary Examiner*—Fred Tzeng

(57) ABSTRACT

An improved mass storage system having a read channel adapted to store in a FIFO memory digitized analog samples of data symbols read from a disk, the buffered digitized samples being processed by digital circuitry that may be operated at a slower speed than the maximum symbol rate from the disk. In one embodiment, the read channel has an analog portion that processes analog signals from a read head and includes an ADC for converting the processed analog signals into digital samples in response to a first clock; a FIFO storing therein the digital samples in response to the first clock and reading out the stored digital samples in response to a second clock; and a detector, in response to the second clock, detecting the digital samples from the FIFO into digital data. The maximum frequency of the first clock is less than the maximum frequency of the second clock.

20 Claims, 1 Drawing Sheet

LOW-POWER READ CHANNEL FOR MAGNETIC MASS STORAGE SYSTEMS

TECHNICAL FIELD

The present invention relates to mass storage devices, and, in particular, to read channels used in mass storage systems or the like.

BACKGROUND

The read channel in a mass storage system "demodulates" data read from a magnetic medium, such as a hard disk, and converts the demodulated data into a form (e.g., digital data) which can be utilized by, for example, a computer.

The data is stored on a disk as symbols, the data having been encoded using a modulation code (e.g., a run-length limited code) and, typically, an error correction code (e.g., a Reed-Solomon and/or Low Density Parity Check) applied prior to encoding with the modulation code, to increase the reliability of the mass storage system. As will be explained in more detail below, the symbols are preferably recorded on the disk with uniform density to strive for the maximum data capacity that the disk can hold. One consequence of using uniform symbol density is that the rate at which the data symbols are read from the disk depends upon which track is being read since the disk spins at a substantially constant rate. In a typical mass storage system, the symbol rate can vary by a factor of two or more between the innermost and outermost tracks.

A typical prior art read channel comprises an analog front-end (AFE) and a digital back end (DBE). The AFE amplifies, filters, and, in response to a clock, digitizes the signals from a read head positioned over the disk, while DBE, also in response to the clock, processes the digitized analog samples from the AFE to recover the stored data. The frequency of the clock is related to the incoming symbol rate. A controller, knowing what track the read head is reading, sets the clock frequency. Generally, all of the circuitry in the read channel is designed to process in real-time the maximum symbol (data) rate that can be read from the disk.

For read channels capable of reading up to many hundreds of megabits per second of data from the disk, all of the circuitry in the read channel, particularly the DBE, is usually implemented in a high-speed, small-geometry, power-hungry, complementary metal-oxide-semiconductor process technology (e.g., 65 nm CMOS). The power consumed by the digital logic in the read channel is highest when the read channel is reading data from the outermost track. The amount of power needed by the read channel, particularly when reading the outermost tracks, might be too much for portable or other low-power applications.

SUMMARY

In one embodiment, the present invention is a mass storage system having at least one read channel, the read channel comprising an analog portion, a first-in-first-out memory (FIFO), and a detector. The analog portion is adapted to process analog signals from a read head, the analog portion including an analog-to-digital converter (ADC) adapted to convert the processed analog signals into digital samples in response to a first clock. The FIFO is adapted to 1) store therein the digital samples in response to the first clock, and 2) read out the digital samples in response to a second clock. The detector is adapted to, in response to the second clock, detect the digital samples from the FIFO into digital data.

In still another embodiment, the present invention is a method of operating a mass storage system having at least one read channel. The method comprises the steps of: processing analog signals from a read head; converting the processed analog signals into digital samples in response to a first clock; storing, in response to the first clock, the digital samples in a first-in-first-out memory (FIFO); reading out the digital samples in response to a second clock; and detecting, in response to the second clock, the digital samples from the FIFO into digital data.

BRIEF DESCRIPTION OF THE DRAWINGS

The aspects, features, and advantages of the present invention will become more fully apparent from the following detailed description, the appended claims, and the accompanying drawings in which like reference numerals identify similar or identical elements.

DETAILED DESCRIPTION

Definitions

Figure 1:
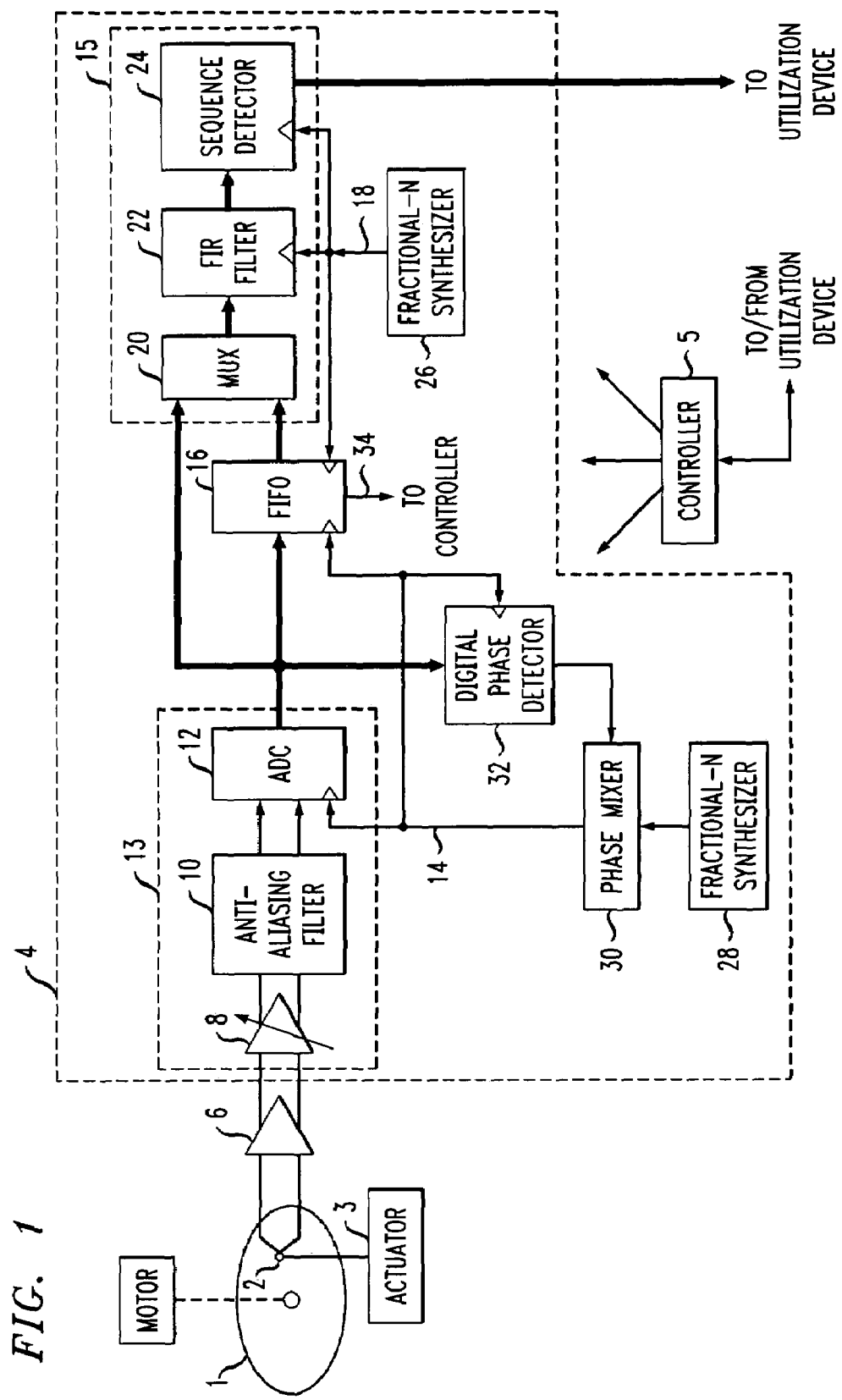
FIG. 1 is a simplified block diagram of a mass storage system having a read channel according to one exemplary embodiment of the present invention.

A track is a ring of bits or symbols comprising sequential magnetic flux reversals having constant radius on a disk drive platter. There may be hundreds of tracks on the disk platter. To maximize the data storage capacity of a disk, the data density (measured in bits $mm^{-2}$) is substantially constant across the disk, and the number of bits in each track increases as the radius of the track increases.

A sector is the basic unit of data used in retrieval and store operations and consists of a uniquely addressable set of data of a predetermined size (typically 512 bytes). Sectors correspond to small arcs of tracks on a disk drive platter that move past read/write heads on a disk as the disk rotates. The number of sectors in a track generally increases with the radius of the track.

Description of the Invention

Referring to FIG. 1, an exemplary embodiment of the invention is shown, in which a simplified block diagram of part of a mass storage system, such as a magnetic hard disk drive, is diagramed (for clarity, much of the system's circuitry is not shown, such as circuitry for writing data to the disk drive and servo control circuitry). As shown, a magnetic disk media 1 is driven by a motor (not numbered) to spin the disk 1 with a substantially constant angular velocity. Data stored on the disk 1 is read by a head 2 positioned by an actuator 3 and the read data is processed by a read channel 4. A controller 5 for the read channel 4, among other functions, controls the actuator 3 and the motor in response to access requests from a utilization device, such as a computer. Signals from the head 2 are first amplified by a preamplifier 6 and further amplified by a variable gain amplifier (VGA) 8. The amplified signals are then filtered by an anti-aliasing filter 10 and the filtered signals are sampled and digitized by analog-to-digital converter (ADC) 12 in response to a clock signal on lead 14 (referred to herein as clock 14). As will be explained in more detail below, the frequency of the clock 14 is dependent on the expected rate of data symbols read by the head 2 depending on which track the head 2 is centered over on the disk 1. For purposes here, the VGA 8, filter 10, and ADC 12 comprise the analog front end (AFE) 13 of the read channel 4 and are typically integrated into a common substrate. The preamplifier 6 is typically remote from the read channel 4 and is located proximate the head 2. The filter 10 may have a cutoff frequency that is dependent on the frequency of clock 14, such as that taught in U.S. Pat. No. 5,327,302, hereby incorporated by reference in its entirety.

A digital back end (DBE) 15 of the read channel 4 comprises the output of a first-in-first-out (FIFO) memory 16, a multiplexer 20, a conventional finite-impulse-response (FIR) filter 22, and a conventional sequence detector 24. Multiplexer 20, filter 22, and detector 24 are controlled by controller 5. Digitized samples from the ADC 12 are stored in the FIFO 16 in response to the clock 14. Data from the FIFO 16, read out in response to a clock signal on lead 18 (referred to herein as clock 18), passes through multiplexer 20 and the FIR filter 22, and then processed by the sequence detector 24. Detector 24, typically comprising a Viterbi decoder and other decoders needed to recover the encoded data, detects the filtered digitized samples to recreate the data stored on the disk 1. The detected data is then sent to a utilization device, such as a computer. For a detailed explanation on how the detector 24 operates, see "A PRML System for Digital Magnetic Recording," by Cideciyan et al., *IEEE Journal on Selected Areas in Communications*, Vol. 10, No. 1, pp. 38-56, January 1992, hereby incorporated by reference in its entirety.

In addition to the FIFO 16, the filter 22 and detector 24 are driven by the clock 18. Clock 18 sequences digital samples out of the FIFO 16 and the samples are processed by the filter 22 and the detector 24 at a rate determined by clock 18. Clock 18 is generated by a conventional fractional-N frequency synthesizer 26, under control of the controller 5.

The clock 14 is generated by a conventional fractional-N frequency synthesizer 28 and phase-adjusted by a conventional phase mixer 30. The synthesizer 28 is controlled by controller 5 to set the frequency of the clock 14 to correspond to the expected symbol rate of the symbols read by head 2. The phase mixer 30 and a digital phase detector form a phase-locked loop to set the phase of clock 14 during a known preamble read from the disk 1 before the data symbols are read so that ADC 12 will correctly sample and digitize the data symbols. For a more detailed explanation of timing recovery and the phase adjustment of the clock 14, see pp. 43-46 of the above-referenced article by Cideciyan et al. and "Fast Timing Recovery for Partial-Response Signaling Systems," by Dolivo et al., *IEEE International Conference on Communications* conference record, pp. 0573-577, 11-14 Jun. 1989, hereby incorporated by reference in its entirety. Alternatively, by using interpolated timing recovery techniques, such as that described in "A MMSE Interpolated Timing Recovery Scheme for the Magnetic Recording Channel," by Wu et al., 1997 *IEEE International Conference on Communications*, Volume 3, pp. 1625-1629, 8-12 Jun. 1997, hereby incorporated by reference in its entirety, the need for phase-locking of clock 14 may be avoided. Thus, when using interpolated timing recovery, phase mixer 30 and phase detector 32 may be eliminated and the output of synthesizer 28 is the clock 14.

The clocks 14 and 18 each have an operating frequency range and corresponding maximum and minimum frequencies as generated by synthesizers 28 and 26, respectively. In this embodiment and as will be described in more detail below, the rate the DBE 15 can process the digitized samples from the FIFO 16 (as controlled by clock 18) is less than the maximum rate the ADC 12 (as controlled by clock 14) can sample and digitize the filtered analog signals from the filter 10. Thus, the maximum frequency of the clock 14 is greater than the maximum frequency of the clock 18. In addition, the minimum frequencies of both clocks 14, 18 may be approximately the same.

In this example, the controller 5 is instructed by the utilization device to read a specified sector in a specified track. The actuator 3, under control of controller 5, then sets the head 2 over the specified track on the disk 1. Prior to reading the disk 1, the controller 5 programs synthesizer 28 to generate clock 14 with the frequency needed for ADC 12 to properly sample the symbols read by head 2. In addition, controller 5 programs synthesizer 26 to generate clock 18 with the frequency needed to process the samples stored in FIFO 16. Because of the disk 1 spins with a substantially constant angular velocity, the symbol rate for the outermost track will be higher than the symbol rate of the innermost track and, thus, the maximum frequency of clock 14, $f_{write}$, is sufficient to properly sample and digitize symbols read from the outermost tracks on disk 1. By using the FIFO 16 to buffer digitized symbols from the ADC 12, the speed requirement of the filter 22 and the detector 24 (hence, the maximum frequency of the clock 18, $f_{read}$) may be lower than would be required for the filter 22 and the detector 24 to process the symbols read from the outermost track on disk 1 in real-time. Advantageously, if $f_{read}$ is less than $f_{write}$, then at least the DBE may be implemented in slower, less power-hungry, logic circuitry than the logic circuitry used to implement the FIFO 16 and ADC 12. Because a typical process technology used to implement a read channel (e.g., 65 nm CMOS) has a substantially constant power-delay product, the highest speed logic circuits uses large (wide) transistors with low threshold voltages to achieve the performance needed to process high speed signals (e.g., symbols being read from the outermost track of the disk 1). In contrast, slower speed logic circuits uses small (narrow) transistors with high threshold voltages for non-critical processing needs. The higher speed comes at the cost of high power demand and large chip area when compared to the slower speed logic. Implementing at least some of the DBE 15 using slower speed logic circuits than in the ADC 12 and FIFO 16 (which must still operate at the higher speed to permit reading the outermost track of disk 1) allows for lower power consumption and smaller chip area than would otherwise be possible had the entire DBE 15 been implemented using the highest speed logic circuits for a given process technology.

The depth of the FIFO 16 depends on the frequencies of the clocks 14 and 18. In this example, one sector at a time is read from the disk 1. The minimum depth of the FIFO 16 is approximately $n \cdot (1 - (f_{read}/f_{write}))$, where n is the minimum number of samples needed to read one sector of data from the disk 1. If more than one sector is to be read at a time (a "burst" read), then the minimum depth is approximately $m \cdot n \cdot (1 - (f_{read}/f_{write}))$, where m is the number of sectors to be read in a burst.

The width of the digital data through FIFO 16, multiplexer 20, filter 22, and detector 24 is determined by the number of bits produced by ADC 12, in this example the ADC 12 generates six bits per sample. The ADC 12 may produce samples with more or fewer bits depending on the desired signal-to-noise ratio of the digitized samples.

Optional multiplexer 20, responsive to the controller 5, allows for bypassing the FIFO 16 if the FIFO is not needed (for example, when the clocks 14 and 18 have the same frequency) and/or for testing purposes.

Optional output 34 from the FIFO 16 signals to controller 5 the status of the FIFO 16, e.g., FIFO overflow, underflow, half-full, etc., for controller 5 to adjust the clock frequency of clocks 14 and 18, as needed, to keep the FIFO 16 from under-flowing or over-flowing.

Filter 22 is, in this example, an FIR filter. Other filter embodiments, such as an infinite impulse response (IIR) filter, may be implemented instead. Also, while the synthesizers 26, 28 are described in this example as fractional-N frequency synthesizers, other frequency synthesizer embodiments, such as numerically controlled oscillators, may be implemented instead.

Advantageously, all of the circuitry of the read channel 4 may be implemented in one mixed signal chip having one or more programmable digital processors or fixed logic arrays, such as microprocessors, digital signal processors (DSP), programmable logic devices (PLD), gate arrays, etc. The processor 5 may also be integrated into a common substrate with the read channel 4 in what is referred to as a system-on-a-chip (SoC).

Although the present invention has been described in the context of a magnetic mass storage system, those skilled in the art will understand that the present invention can be implemented in the context of other types of storage systems.

For purposes of this description and unless explicitly stated otherwise, each numerical value and range should be interpreted as being approximate as if the word "about" or "approximately" preceded the value of the value or range. Further, reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the terms "implementation" and "example."

Also for purposes of this description, the terms "couple," "coupling," "coupled," "connect," "connecting," or "connected," refer to any manner known in the art or later developed in which a signal is allowed to be transferred between two or more elements and the interposition of one or more additional elements is contemplated, although not required. Conversely, the terms "directly coupled," "directly connected," etc., imply the absence of such additional elements. Also, signals and corresponding nodes, ports, inputs, or outputs may be referred to by the same name and are interchangeable. Similarly, the contents of a register and the register's name may be referred to by the same name and are interchangeable.

It is understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

The invention claimed is:

1. A mass storage system having at least one read channel, the read channel comprising:
    an analog portion, adapted to process analog signals from a read head, the analog portion including an analog-to-digital converter (ADC) adapted to convert the processed analog signals into digital samples in response to a first clock;
    a first-in-first-out memory (FIFO) adapted to 1) store therein the digital samples in response to the first clock, and 2) read out the digital samples in response to a second clock; and
    a detector adapted to, in response to the second clock, detect the digital samples from the FIFO into digital data.

2. The mass storage system of claim 1, wherein the first clock has a first operating frequency range with a maximum frequency, $f_{write}$, and the second clock has a second operating frequency range with a maximum frequency, $f_{read}$, the maximum frequency of the first operating frequency range being greater than the maximum frequency of the second operating frequency range.

3. The mass storage system of claim 2, wherein the first operating frequency range has a minimum frequency and the second operating frequency range has a minimum frequency, the minimum frequency of the first operating frequency range being substantially the same as the minimum frequency of the second operating frequency range.

4. The mass storage system of claim 2, wherein the mass storage system is adapted to store therein a plurality of sectors, the system is further adapted to read one sector at a time, and wherein the FIFO has depth of at least $n \cdot (1-(f_{write}/f_{read}))$ digital samples, where n is a desired number of digital samples per sector.

5. The mass storage system of claim 2, wherein the mass storage system is adapted to store therein a plurality of sectors, the system is further adapted to read m sectors at a time, and wherein the FIFO has a depth of at least $m \cdot n \cdot (1-(f_{write}/f_{read}))$ digital samples, where n is a desired number of digital samples per sector.

6. The mass storage system of claim 1, further comprising a filter disposed between the FIFO and the detector.

7. The mass storage system of claim 6, further comprising a multiplexer for selectively bypassing the FIFO by coupling the ADC to the filter.

8. The mass storage system of claim 7, wherein the filter is a FIR filter responsive to the second clock.

9. The mass storage system of claim 1, further comprising:
    a first frequency synthesizer adapted to generate the first clock signal;
    a second frequency synthesizer adapted to generate the second clock signal; and
    a controller adapted to control the detector and the first and second frequency synthesizers.

10. The mass storage system of claim 9, wherein the FIFO is adapted to send FIFO status information to the controller, and the controller is adapted to adjust the frequencies of the first and second clock signals in response to the status information.

11. The mass storage system of claim 1, wherein the analog portion further comprises:
    a variable gain amplifier;
    an anti-aliasing filter;
    wherein the variable gain amplifier and the anti-aliasing filter are coupled in series to the ADC, and the anti-aliasing filter has a cutoff frequency proportional to the frequency of the first clock.

12. A method of operating a mass storage system having at least one read channel, comprising the steps of:
 a) processing analog signals from a read head;
 b) converting the processed analog signals into digital samples in response to a first clock;
 c) storing, in response to the first clock, the digital samples in a first-in-first-out memory (FIFO);
 d) reading out the digital samples from the FIFO in response to a second clock; and
 f) detecting, in response to the second clock, the digital samples from the FIFO into digital data.

13. The method of claim 12, wherein the first clock has a first operating frequency range with a maximum frequency, $f_{write}$, and the second clock has a second operating frequency range with a maximum frequency, $f_{read}$, the maximum frequency of the first operating frequency range being greater than the maximum frequency of the second operating frequency range.

14. The method of claim 13, wherein the first operating frequency range has a minimum frequency and the second operating frequency range has a minimum frequency, the minimum frequency of the first operating frequency range being substantially the same as the minimum frequency of the second operating frequency range.

15. The method of claim 13, wherein the mass storage system is adapted to store therein a plurality of sectors, the system is further adapted to read one sector at a time, and wherein the FIFO has depth of at least $n \cdot (1-(f_{write}/f_{read}))$ digital samples, where n is a desired number of digital samples per sector.

16. The method of claim 12, further comprising the step of:
 g) filtering, in response to the second clock and in a FIR filter, the digital samples from the FIFO; wherein the digital samples from the FIFO in step f) are the filtered digital samples.

17. A mass storage system having at least one read channel, the read channel comprising:
 an analog portion, adapted to process analog signals from a read head, the analog portion including an analog-to-digital converter (ADC) adapted to convert the processed analog signals into digital samples in response to a first clock;
 a first-in-first-out memory (FIFO) adapted to 1) store therein the digital samples in response to the first clock, and 2) read out the digital samples in response to a second clock;
 a FIR filter, responsive to the second clock, adapted to filter the digital samples from the FIFO; and
 a detector adapted to, in response to the second clock, detect the filtered digital samples from the FIR filter into digital data;
 wherein the first clock has a first operating frequency range with a maximum frequency, $f_{write}$, and the second clock has a second operating frequency range with a maximum frequency, $f_{read}$, the maximum frequency of the first operating frequency range being greater than the maximum frequency of the second operating frequency range, and wherein the first operating frequency range has a minimum frequency and the second operating frequency range has a minimum frequency, the minimum frequency of the first operating frequency range being substantially the same as the minimum frequency of the second operating frequency range.

18. The mass storage system of claim 17, wherein the mass storage system is adapted to store therein a plurality of sectors, the system is further adapted to read one sector at a time, and wherein the FIFO has depth of at least $n \cdot (1-(f_{write}/f_{read}))$ digital samples, where n is a desired number of digital samples per sector.

19. The mass storage system of claim 17, further comprising:
 a first frequency synthesizer adapted to generate the first clock signal; and,
 a second frequency synthesizer adapted to generate the second clock signal.

20. The mass storage system of claim 19, further comprising a controller, wherein the controller is adapted to control the detector, FIR filter, and the first and second frequency synthesizers.

* * * * *